United States Patent [19]
Canfield, Jr.

[11] 4,014,035
[45] Mar. 22, 1977

[54] MULTIPLE EXPOSURE CAMERA TAKE-UP SPOOL

[76] Inventor: Carl Rex Canfield, Jr., 12317 Windsor Drive, Carmel, Ind. 46032

[22] Filed: Sept. 23, 1975

[21] Appl. No.: 616,080

[52] U.S. Cl. .................... 354/209; 242/71
[51] Int. Cl.² ........................... G03B 1/40
[58] Field of Search .......... 354/207, 208, 209, 295; 242/71

[56] References Cited

UNITED STATES PATENTS 3,650,191    3/1972    Nomura ................ 354/209

FOREIGN PATENTS OR APPLICATIONS 1,147,472    4/1963    Germany ................ 354/207
2,262,058    7/1973    Germany ................ 354/209

*Primary Examiner*—Edna M. O'Connor
*Attorney, Agent, or Firm*—Thomas J. Greer, Jr.

[57] ABSTRACT

A device for a camera to permit multiple exposures whenever desired by an operator. The device is a film take-up spool formed of two relatively rotatable parts. The two parts are normally coupled by a spring-urged clutch. To disengage the clutch, and thereby permit cocking of the shutter without the usual rotation of the film take-up spool, a thin rod or pin is inserted through a hole in the end of the take-up spool retainer to disengage the clutch. Disengagement means may be built into the take-up spool retainer as a simple push button.

8 Claims, 12 Drawing Figures

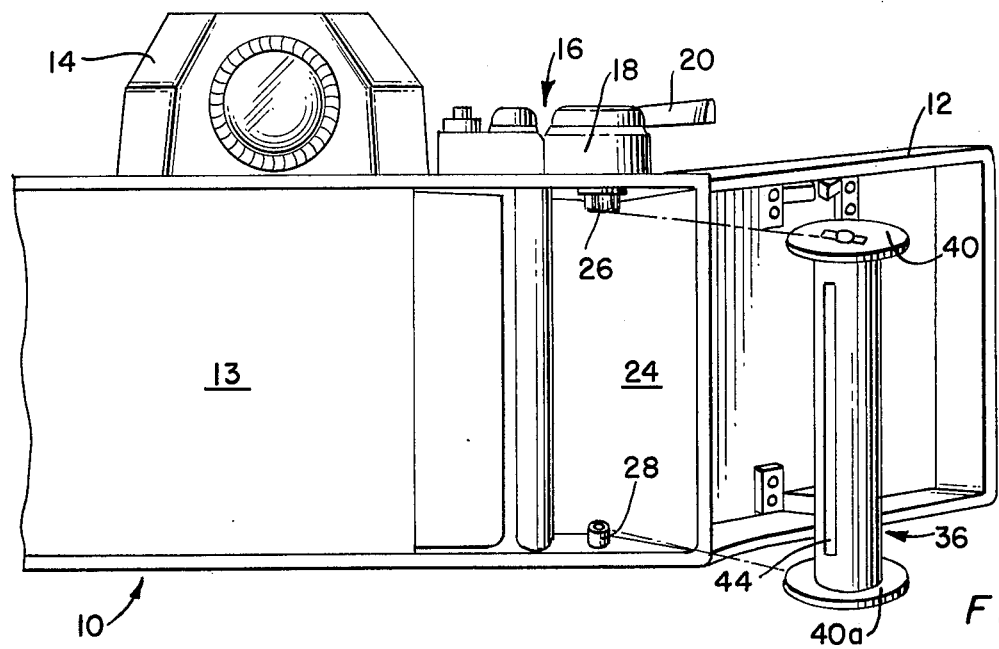
FIG.1.
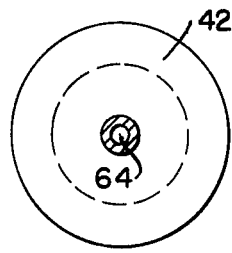
FIG.3.
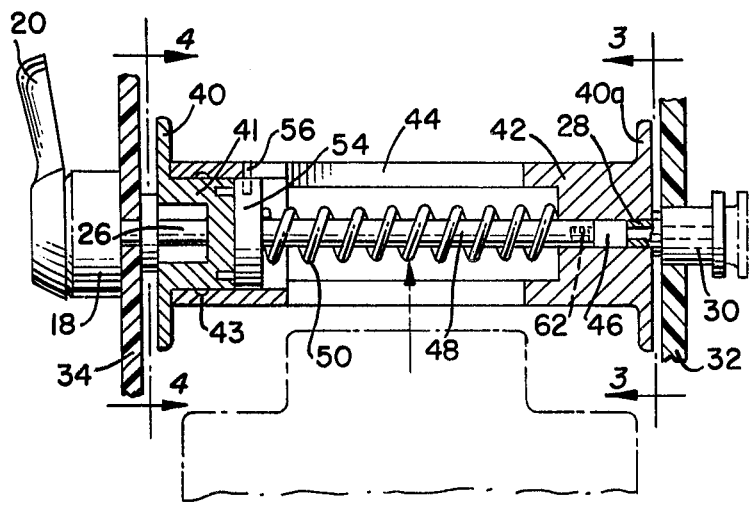
FIG.2.
FIG.4.
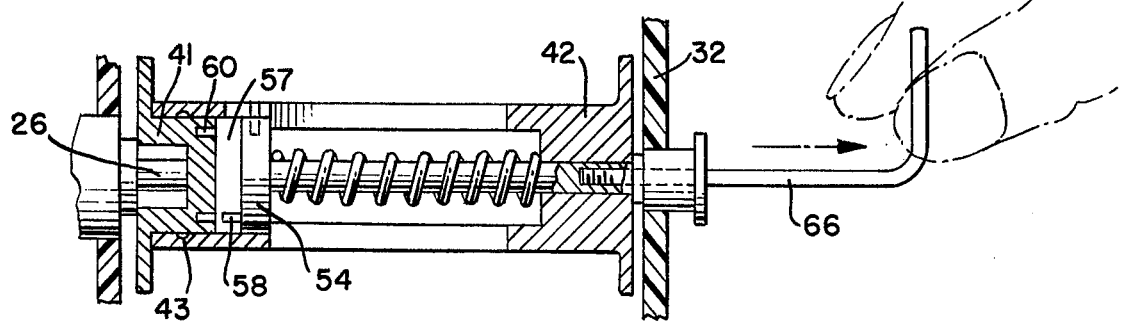
FIG.5.

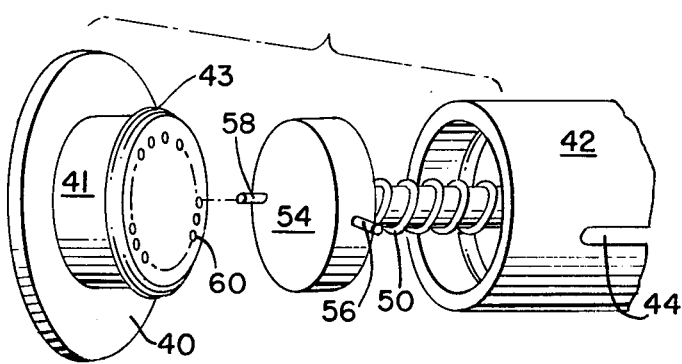
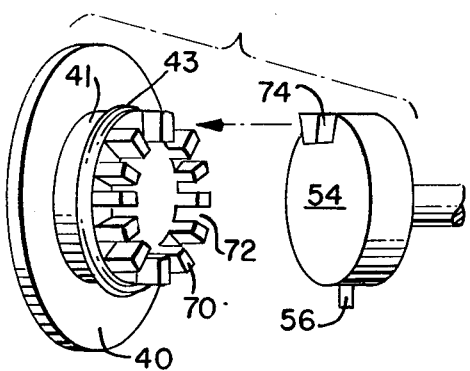
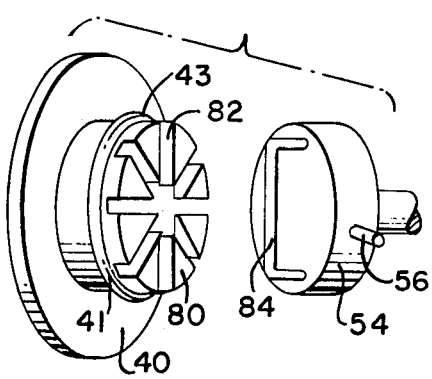
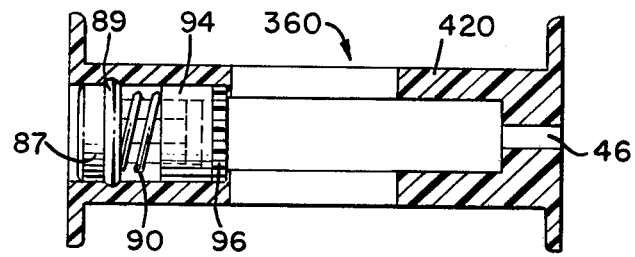
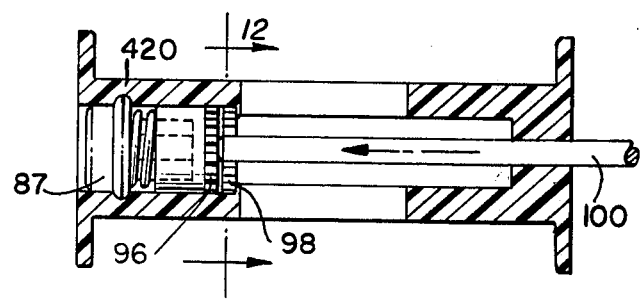
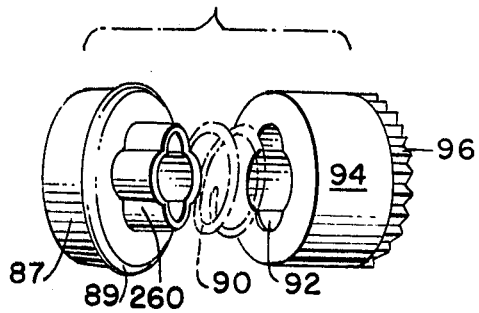
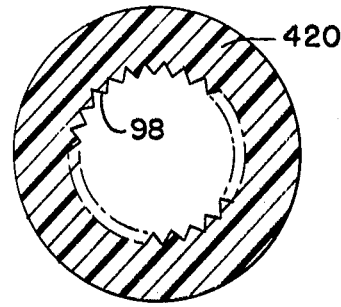

MULTIPLE EXPOSURE CAMERA TAKE-UP SPOOL

This invention relates to cameras and more particularly to a camera and take-up spool construction which will permit the operator to make multiple exposures on a single area of film whenever desired.

The prior art is aware of devices which will permit the operator of a camera, whenever it is desired, to make multiple exposures of a single film area. Such devices are shown in, but not necessarily limited to, the following U.S. Pat. Nos.: 2,218,241 — Hughey; 2,304,887 — Crumrine; 2,559,880 — Kesel; 2,663,234 — Hodges; 2,769,380 — Rapaport; 2,892,392 — Harris; 3,650,191 — Nomura; 3,621,770 — Tsuruoka; 3,687,039 — Furuta; 3,688,671 — Irwin; 3,829,876 — Uno; 3,864,706 — Urano. Such devices as these may be found in the current U.S. Patent and Trademark Office classification, Class 354, Subclasses 11, 170, 171, and 209. It is understood that such devices may be found in yet other classification areas.

Most cameras of the type adapted to advance film from the supply spool to a take-up spool include a mechanism which simultaneously cocks the shutter for the next taking or next exposure and which advances the take-up spool. In this manner, after the shutter has been actuated to make a single exposure, the operator of the camera need not, as a separate step, wind the take-up spool after cocking the shutter for a subsequent shutter operation. By virtue of interconnecting the shutter cocking mechanism with the take-up spool rotation mechanism, double or multiple exposures are precluded. A multiple exposure arises when after a single exposure of a portion of the photographic film to light, a second exposure of a different scene is made. This results in double images upon development of the film and in the case of multiple exposures, multiple images. In general, multiple exposures are not desired. However, there arises situations wherein the operator of the camera may wish to make two or more exposures on a single area of film.

In order to effect such multiple exposures, the prior art, as exemplified by the patents noted above, has had recourse to relatively complex and expensive arrangements. In general, such prior art efforts to enable the operator of the camera to achieve multiple exposures have involved a modification of the linkage between the shutter cocking mechanism and the take-up spool rotating mechanism. While apparently successful for the purpose intended, these constructions have been somewhat expensive and complex.

In accordance with the practice of this invention, multiple exposures of a single photographic film area is facilitated by a novel take-up spool construction. Only a single, inexpensive modification is required for most cameras in order to accommodate or to accept the novel take-up spool of this invention. In this manner many, if not most, present cameras which employ rotary spool film advancing constructions may be easily modified so that the user may, at will, make multiple exposures. The modified take-up spool according to the practice of this invention may be used in the same manner as a conventional take-up spool, if so desired by the operator of the camera. The practice of this invention permits either the manufacturer of cameras to make a slight modification of the camera or, alternatively, the user of the camera may make the slight modification himself or have it made by a camera service shop. The take-up spools of this camera may be sold in commerce as a shelf item.

IN THE DRAWINGS

FIG. 1 is a partial perspective view of a typical camera looking to the front from the rear and illustrating the insertion of a take-up spool constructed in accordance with this invention.

FIG. 2 is a transverse cross-sectional view taken along the axis of a spool constructed in accordance with this invention and showing its relationship to certain elements of a conventional camera.

FIG. 3 is a view taken along section 3—3 of FIG. 2.

FIG. 4 is a view taken along section 4—4 of FIG. 2.

FIG. 5 is a view similar to FIG. 2 and illustrates the disengaging of a certain clutch of the film take-up spool of FIG. 2 whenever multiple exposures are desired.

FIG. 6 is an exploded, partial perspective view of the novel take-up spool of this invention illustrated at FIG. 2.

FIG. 7 is a view similar to FIG. 6, and shows a modification.

FIG. 8 is a view similar to FIG. 6 and shows another modification.

FIG. 9 is a view similar to FIG. 2 and shows still another embodiment.

FIG. 10 is a view similar to FIG. 9 and illustrates how a certain clutch of FIG. 9 is disengaged.

FIG. 11 is a perspective, exploded view illustrating the embodiment of FIG. 9.

FIG. 12 is a view taken along section 12—12 of FIG. 10.

Referring now to the drawings, the numeral 10 denotes generally a conventional camera and includes a rear pivoted cover 12 which, when closed, renders lightproof the interior denoted generally by the numeral 13. The numeral 14 denotes a typical view-finder of the camera. The numeral 16 denotes generally a shutter-cocking and take-up spool advancing mechanism which includes a hub 18 extending exteriorally of the camera and provided with a lever 20. The numeral 24 denotes a recess for the reception of a take-up spool, with a rotary drive spindle key 26 attached to hub 18 and rotatable upon rotation of lever 20 at one end, with spool retainer pin 28 positioned at the other end of cavity 24. In operation, when lever 20 is rotated, the shutter is automatically recocked for the next exposure, and drive spindle 26 rotates an amount sufficient to advance the film so that fresh photographic film will be exposed upon subsequent shutter operation.

The numeral 30 denotes a bushing integrally secured to retainer pin 28 and, as indicated by the dashed lines at FIG. 2, is adapted to be pulled out to allow the takeup spool to be removed. The numerals 32 and 34 denote walls of the camera which partially define spool cavity 24.

The numeral 36 denotes generally the take-up spool of this invention and includes flange elements 40 and 40a at either end. Flange 40a is integral with main body cylindrical portion 42 of take-up spool 36, the latter including conventional longitudinal extending slots 44 to receive an end of a film strip. The reader will here note that, as shown at FIG. 1, the spool 36 of this invention appears similar to a conventional take-up spool.

The numeral 41 denotes a plug with an integral flange 40, the plug received by the left end (at FIG. 2) of the spool and rotatably driven by spindle 26. An integral, annular rib 43 is carried by plug 41 and is received by a complementary circular groove within the spool. Plug 41 is itself rotatable within and respect to the spool but once inserted (as by a snap action) does not move axially of the spool.

The numeral 46 denotes a centrally extending recess whose axis is coincident with the longitudinal axis of spool 36, recess 46 provided at the right-hand (FIG. 2) portion of the spool. Rod 48 has one end received in recess 46, the rod being surrounded by a metal spring 50. Spring 50 is in the compressed state as illustrated at FIG. 2. The numeral 54 denotes a disc secured to the left-end of rod 48, the disc carrying at one peripheral portion a radially extending pintle 56. Disc 54 is adapted to slightly reciprocate within cavity portion 57 (note FIG. 5). Pintle 56 of the disc 54 is adapted to slightly reciprocate over a portion of one of the slots 44 of the take-up spool.

The left face of disc 54 is provided with an axially extending pintle 58 adapted to enter into one of a plurality of angularly-spaced recesses 60 in the right face of plug 41. The numeral 62 (see FIG. 2) denotes a threaded recess in the right-hand end of rod 48. Bushing 30 is provided, according to the practice of this invention, with a through recess 64 (see FIG. 3) which in turn is adapted to receive an elongated tool or rod 66, the end of tool 66 adapted to be inserted through aperture 64 and into threaded recess 62 for engagement with rod 48. The attention of the reader is directed to FIG. 6 for yet another illustration of the elements shown at the left-hand portion of FIGS. 2 and 5 of the drawings.

The mode of operation of the above-described embodiment is as follows. During normal operation of the camera by an operator wherein no multiple exposures are desired, the camera is operated in a normal manner. That is to say, after each taking operation, the shutter cocking lever 20 is rotated to thereby re-cock the shutter and, simultaneously, to rotate drive spindle 26 for the purpose of taking up a predetermined length of film so as to expose fresh photographic film to the action of light whenever the shutter is actuated a second time. This process may continue until all of the film has been exhausted. On the other hand, should it be desired by the operator to make plural exposures, the operation is as follows. First, the operator actuates the shutter to make a first exposure on a length of film. Next, the operator inserts elongated tool 66 as indicated at FIG. 5 of the drawings. This is done by inserting the left, threaded end of 66 into recess 64 until it engages threads 62. Tool 66 is now rotated until the threaded engagement is complete. Next, tool 66 is pulled in the direction of the arrow as shown at FIG. 5 to thereby further compress the bias spring 50 and pull disc 54 against the force of the spring so that the disc assumes the position shown at FIG. 5. In the position indicated at FIG. 5, plug 41 is free to rotate relative to the remaining portion of the take-up spool 36. The rib 43, however, precludes translational motion of the plug along the axis of the take-up spool. With the elements in the position indicated at FIG. 5, the operator of the camera now actuates the shutter cocking lever 20 to thereby re-cock the shutter. The drive spindle 26 has rotated plug 41, but the spool has not rotated to advance the film. The camera is now in a condition such that the next actuation of the shutter will result in a second exposure of the same film strip area. If desired, the process may be repeated for a third, fourth, etc., exposure.

The reader will now be in a position to observe that whenever a second, third, etc., exposure is desired. The steps of inserting tool 66 and making threaded engagement so as to move plug 54 to the position shown at FIG. 5 is required. In those cases wherein only a partial double exposure is required, the disc 54 may be held in the position indicated at FIG. 5 only for a portion of the shutter cocking rotation of lever 20, the tool 66 then being released and further rotation of drive spindle 26 will result in at least a partial turning of spool 36.

The reader will note that the disc 54, the spring 50, the recesses 60, and associated elements may be considered as a spring-urged clutch which is normally engaged but may become disengaged whenever actuated by tool 66 in the manner indicated at FIG. 5.

FIG. 7 of the drawings illustrates another embodiment and differs primarily from that of the embodiment shown at FIG. 6 in the form of the engagement between the disc and plug element. In FIG. 7, axially extending tongues 70 having recesses 72 define between them. These recesses receive, selectively, an axially extending tongue 74 attached to disc 54. In this embodiment, tongue 74 functions as pintle 58 of the previous embodiment, while recesses 72 function as recesses 60 of the previous embodiment.

Referring now to FIG. 8 of the drawings, still another embodiment is illustrated wherein the plug 41 is provided with tongues 80 having spaces 82 therebetween, pairs of spaces being diametrically aligned. The numeral 84 denotes a drive element in the form of an elongated U having its ends attached to disc 54. The mode of operation is believed apparent.

Referring now to FIGS. 9–12 of the drawings, still another modification is illustrated, here making possible clutch disengagement by a push of a suitable tool instead of a pull. Referring now to FIGS. 9–12, the numeral 360 denotes a take-up spool similar to spool 36, the chief difference being that the intermediate spool body, denoted by the numeral 420, is integral with both end flanges. As before, the numeral 46 denotes a through recess at the right-hand end of the take-up spool and the spool is provided with the conventional slots 44 for the reception of the end of a film strip. The numeral 87 denotes a plug having an enlarged and continuous annular flange 89 and having a central projecting key 260, similar in configuration to spindle 26 of the first-described embodiment. The numeral 90 denotes a compression spring adapted to fit around drive key 190 and to abut on its left portion the plug 87. The numeral 92 denotes a recess in the left-hand portion of a bushing 94, which recess is adapted to receive the drive element 190. The right-hand portion of bushing 96 is provided with a plurality of serrations 96 which are adapted to engage, in one axial position of the plug 94, serrations 98 within the interior of take-up spool 360.

As before, the take-up spool may be operated as a conventional take-up spool, i.e., no double exposures being made. In the event, however, that the operator of the camera wishes to make multiple exposures, the following steps are carried out. With the spool 360 in the position similar to that shown at FIG. 2, i.e., with drive key 19 being received by the corresponding drive aperture in the left face of plug 87, an elongated tool 100 is inserted into the aperture 64 in bushing 30 of the camera. The motion continues, with the left-end of tool 100 entering through recess 46 and finally abutting the planar, right face of bushing 94. The tool 100 is now given an additional urging in the same direction, as indicated at FIG. 10, such that bushing 94 compresses spring 90 to thereby disengage teeth 96 from complementary recesses 98 in spool 360. Now, the shutter cocking lever 20 is rotated by the operator with the result that plug 87 rotates but does not impart its rotation to the film carrying, outer cylindrical portion 420 of the spool. The shutter cocking lever 20 either continues its cocking action by rotation with continued depression of tool 100, or, alternatively, the tool 100 may be released to permit partial rotation of the spool 360 with the remainder of the cocking motion of lever 20. Without going into further detail, the reader is now in a position to observe that the action of this embodiment is entirely similar to that previously described, with the exception that the disengaging tool 100 need not be threaded and, further, the tool is pushed into the camera as opposed to being pulled away from it. Again, the mechanism of this embodiment may be considered as a clutch which is normally engaged but which may be disengaged by the special tool. As in the previously-described embodiment, it is only necessary to provide the bushing 30 with the through aperture 64 for the reception of an elongated disengaging tool.

The disc 54, spring 50, elongated rod 48, plug 87, spring 90, and associated elements may be formed of metal or of any suitable materials, such as a plastic having the required strength and durability.

It will be obvious to those skilled in the art that the disengagement means of this invention may also be provided within the take-up spool retainer on new camera designs and most roll film cameras used by professional and advanced amateur photographers may be easily modified. In accordance with the practice of this invention, 35 MM cameras normally have take-up spools fixed in the camera. Some 35 MM cameras have complicated multiple exposure means provided which could be simplified by practice of the invention.

I claim:

1. In a camera of the type having a roll film supply spool and a film take-up spool, a shutter cocking and film advancing mechanism coupled to the film take-up spool, whereby cocking the shutter rotates the film take-up spool to advance the film for the subsequent taking operation, to thereby prevent double exposures, and a movable retainer pin engaging one end of the film take-up spool the improvement comprising, means carried by said take-up spool to prevent rotation of the take-up spool upon actuation of the shutter cocking mechanism, whereby double exposures may be deliberately made.

2. The camera of claim 1 wherein said take-up spool is of two relatively rotatable parts, which parts are normally engaged to move together.

3. The camera of claim 2 including a disengaging rod extending from the take-up spool through the take-up spool retainer pin to the exterior of the camera whereby actuation of the rod controls the disengagement of the two relatively rotatable parts of the spool.

4. The camera of claim 2 wherein one of said spool parts fits within the other, the inner one of the two relatively rotatable take-up spool parts being engaged by a rotary drive spindle of the film advancing mechanism of the camera.

5. In a camera of the type adapted to carry a supply roll film spool and a take-up spool and having a movable retainer pin adapted to engage a take-up spool, a shutter cocking and film advancing mechanism coupled to the film take-up spool, whereby cocking the shutter rotates the take-up spool to advance the film for a subsequent taking operation, to thereby prevent double exposures, the improvement comprising, an opening through the take-up spool retainer pin, the opening adapted to receive means for actuating a rotation disengagement mechanism carried by the take-up spool.

6. A camera take-up spool construction for permitting multiple exposures, the spool adapted for use in a camera of the type having a film take-up spool held in place and releasable by a retainer pin, the take-up spool adapted to rotate to advance film from a supply roll spool, the take-up spool adapted to be coupled to a shutter cocking mechanism such that the take-up spool is rotated at the same time the shutter is cocked to thereby advance the film and thus prevent double exposure, the take-up spool formed of two relatively rotatable parts with one of said spool parts adapted to engage a camera rotary drive spindle and the other part adapted to be attached to a photographic film, the spool parts normally coupled for rotation together by a clutch.

7. The spool construction of claim 6 wherein one of said spool parts fits within the other and wherein the said clutch includes a disc reciprocable along the longitudinal axis of said take-up spool but non-rotatable with respect thereto, the disc being normally spring biased into engagement with the inner spool part, the inner spool part adapted to engage a rotary drive spindle, said disc being movable against spring bias to move away from said engagement and wherein said clutch is adapted to be disabled by a disabling rod insertable into an end of the take-up spool to thereby actuate the disc against the spring bias.

8. The spool construction of claim 6 wherein said inner spool part resiliently snaps into the outer spool part for relative rotation therewith, whereby the inner spool part is retained within the outer spool part against the action of spring bias.

* * * * *